US011968325B1

(12) United States Patent
Howell (10) Patent No.: US 11,968,325 B1
(45) Date of Patent: \*Apr. 23, 2024

(54) VERIFICATION OF CALLER IDENTIFICATION USING APPLICATION

(71) Applicant: United Services Automobile Association (USAA), San Antonio, TX (US)

(72) Inventor: Michael W. Howell, San Antonio, TX (US)

(73) Assignee: United Services Automobile Association (USAA), San Antonio, TX (US)

(*) Notice: Subject to any disclaimer, the term of this patent is extended or adjusted under 35 U.S.C. 154(b) by 0 days.

This patent is subject to a terminal disclaimer.

(21) Appl. No.: 18/154,753

(22) Filed: Jan. 13, 2023

Related U.S. Application Data

(63) Continuation of application No. 16/909,461, filed on Jun. 23, 2020, now Pat. No. 11,558,502.

(51) Int. Cl.
*H04M 3/42* (2006.01)
*H04M 3/436* (2006.01)
*H04M 3/533* (2006.01)

(52) U.S. Cl.
CPC ....... *H04M 3/42059* (2013.01); *H04M 3/436* (2013.01); *H04M 3/533* (2013.01)

(58) Field of Classification Search
CPC ... H04M 3/42059; H04M 3/436; H04M 3/533
USPC ........................................................ 370/259
See application file for complete search history.

(56) References Cited

U.S. PATENT DOCUMENTS

| 7,734,033 | B2 | 6/2010 | Aupperle et al. |
| 8,144,841 | B2 | 3/2012 | Rice |
| 10,149,156 | B1* | 12/2018 | Tiku ...................... H04W 12/66 |
| 2005/0107074 | A1 | 5/2005 | Zellner |
| 2009/0025062 | A1* | 1/2009 | Gustave ................ H04L 63/126 |
| | | | 726/4 |
| 2011/0143714 | A1 | 6/2011 | Keast et al. |
| 2020/0389552 | A1 | 12/2020 | Trim et al. |

FOREIGN PATENT DOCUMENTS

GB                2553107 A * 2/2018 ........... H04L 63/083

* cited by examiner

*Primary Examiner* — Ahmad F. Matar
*Assistant Examiner* — Jirapon Tulop
(74) *Attorney, Agent, or Firm* — Perkins Coie LLP (57) ABSTRACT

Technology for identifying that a communication is from a verified enterprise includes receiving, by a device associated with a user, a data packet from a phone network. The data packet can be included in a communication to the device, which can have an application configured to verify communications from at least one enterprise. A token within the data packet can be identified by the application, and the application can compare the token to at least one token identifier associated with the at least one enterprise. In response to the token corresponding to at least one token identifier, the application can verify that the communication is from the at least one enterprise. In response to the communication being verified, the application can display a validation image on the device.

20 Claims, 9 Drawing Sheets

VERIFICATION OF CALLER IDENTIFICATION USING APPLICATION

CROSS-REFERENCE TO RELATED APPLICATIONS

This application is a continuation of U.S. patent application Ser. No. 16/909,461, filed on Jun. 23, 2020, entitled "VERIFICATION OF CALLER IDENTIFICATION USING APPLICATION," which is hereby incorporated by reference in its entirety for all purposes.

TECHNICAL FIELD

Various embodiments of the present disclosure generally relate to caller identification in communication. More specifically, various embodiments of the present disclosure relate to methods and systems for identifying communications from verified entities.

BACKGROUND

Phone companies can detect a phone number, if it is identified, of an incoming call and display the phone number to the user. Some users will store phone numbers in a list of contacts on their device, and their device can then display a business or other name associated with the phone number. Unfortunately, scammers and spoofers can send phone numbers, names, and/or location information through the phone system that can identify the call as originating from a different business and/or location. Therefore, users may answer the phone because they believe that they are receiving a legitimate call from a known business. Users may provide private and/or personal information to the caller that can result in fraud or identify theft.

The techniques introduced here may be better understood by referring to the following Detailed Description in conjunction with the accompanying drawings, in which like reference numerals indicate identical or functionally similar elements. Moreover, while the technology is amenable to various modifications and alternative forms, specific embodiments have been shown by way of example in the drawings and are described in detail below. The intention, however, is not to limit the technology to the particular embodiments described. On the contrary, the technology is intended to cover all modifications, equivalents, and alternatives falling within the scope of the technology as defined by the appended claims.

DETAILED DESCRIPTION

Many enterprises and institutions call a user for legitimate purposes. However, users often do not answer the call because they are unsure about the identity of the caller. Even when the user recognizes the name and/or number, he or she is aware that the name and/or number can be spoofed. Many fraudsters and spoofers will manipulate the information sent with the phone call to appear to be a legitimate business, such as the Social Security Administration or a bank. The caller identification system can then present the information to the user, who may believe the call is legitimate. If the user answers the phone, he or she may provide personal and/or sensitive information that can result in identify theft or loss of money.

Methods, systems, and apparatus disclosed herein can provide technical advantages over conventional caller identification systems by verifying the identify of a caller based on information sent in a data packet from a verified enterprise or business. Such a technique can improve a user's interaction with verified enterprises as a visual confirmation can be presented on the display of the user's phone or other device to identify verified calls, thus providing a technical solution for identifying verified enterprises. Additionally, the disclosed system can allow the user to better interact with the verified enterprises, such as by not missing returned or important calls (e.g., from a bank, doctor's office, etc.). Furthermore, a technical solution is provided for reducing and/or eliminating fraud as a user can avoid answering a call that is not verified, even if the caller identification has identified the call as originating from a known caller, such as their bank. Such a technique can, for example, reduce fraud caused by spoofers who are pretending to be someone else. The example headings for the various sections below are used to facilitate the understanding of the disclosed subject matter and do not limit the scope of the claimed subject matter in any way. Accordingly, one or more features of one section can be combined with one or more features of another section.

I. Identify a Verified Caller

Figure 1:
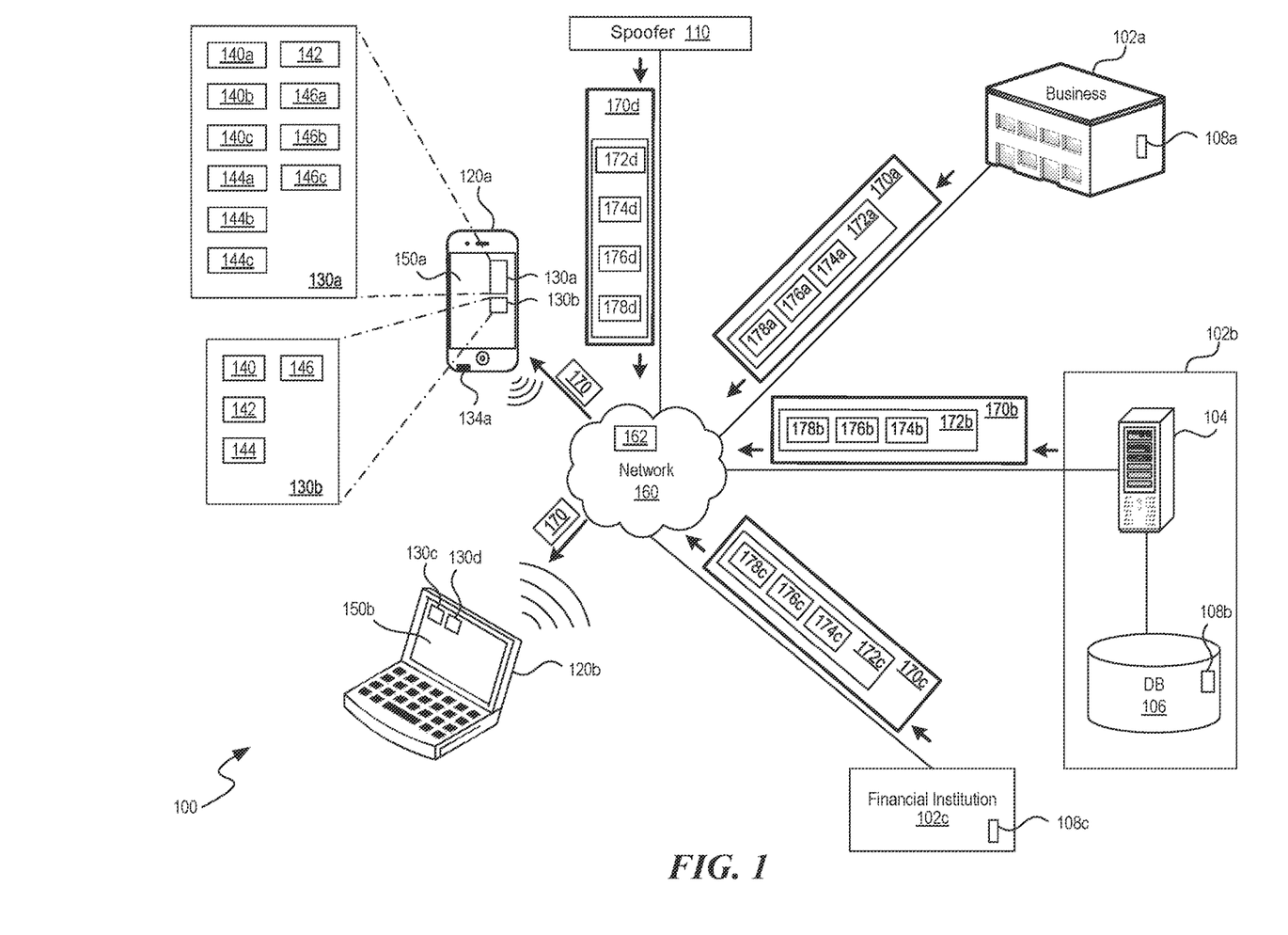
FIG. 1 shows an example of a caller verification system that can use a caller verification application to verify the identity of a caller in accordance with embodiments of the present technology.

FIG. 1 shows an example of a caller verification system 100 that can use a caller verification application 130 on a device 120 to verify the identity of a caller in accordance with embodiments of the present technology. A validation image or icon can be displayed on the device 120 when the call is verified. The user can view the validation image and/or icon prior to answering the call, listening to a voicemail, or opening a text message. If the validation image is displayed, the user can be confident that the caller is who they claim to be. If the validation image is not displayed, the caller is not verified and the user can choose to ignore the call, potentially avoiding a telemarketer or someone intending to commit fraud.

The devices 120, such as a mobile phone 120a and/or smart phone, and a laptop 120b, are each associated with a phone number. Other communication devices may be used, such as a smart watch, tablet, home computer, and the like. The devices 120 can receive communications 170 transmitted to the phone number. One or more caller verification applications 130 (identified individually as 130a, 130b, 130c, and 130d) on the devices 120 can identify data within the communication 170 to determine whether the communication 170 was sent by a verified enterprise or other verified caller.

Legitimate enterprises 102 (identified individually as 102a, 102b, and 102c) are shown. For example, enterprise 102a may be a business that sells a product, enterprise 102b may be a call center, and enterprise 102c may be a financial institution. Other enterprises 102 can be hospitals, medical offices, dental offices, and/or businesses the user has a relationship with, such as a school, spa, gym, etc. The enterprise 102 may be calling the user to verify appointments, return a call, convey information, and/or offer goods and services the user is or may be interested in. Spoofer 110 illustrates an operation in which the spoofer represents themselves to the user as someone they are not. Therefore, the spoofer 110 can be attempting to solicit business and/or information under false pretenses.

The enterprise 102 transmits the communication 170 (identified individually as 170a, 170b, and 170c) to the device 120 over a network 160. The communication 170 can be a phone call (e.g., voice call) or a text message. The enterprise 102 includes a data packet 172 (identified individually as 172a, 172b, and 172c) as part of the communication 170. The data packet 172 includes a set of digital characters that can be used by a carrier or phone network 162 (e.g., telephone system provider, wireless carrier, plain old telephone system (POTS), third party caller identification system, etc.) to identify who is originating the call. The data packet 172 can include a phone number 176 (identified individually as 176a, 176b, and 176c) of the enterprise 102, a name 178 (identified individually as 178a, 178b, and 178c) or other identifying information for the enterprise 102, and/or other information the enterprise 102 wants to have displayed on the user's caller identification (ID).

Similarly, the spoofer 110 can transmit the communication 170d to the device 120 over the network 160. The communication 170d can include the data packet 172d that can falsify the phone number 176d and/or name 178d. For example, the spoofer 110 may take advantage of the data packet 172d by inserting erroneous and/or misleading information, such as a phone number for a different business or person, a name of a different business or person, a geo-location identifier such as the area code associated with the device 120 rather than the area code of the spoofer 110, and the like. Accordingly, the user of the device 120 can be enticed and/or tricked into answering an incoming call, voicemail and/or text that the user believes is a legitimate communication from a business they recognize and/or trust, or a call from someone who is local to them.

The enterprise 102 can have a token generator 108 (identified individually as 108a, 108b, and 108c) that generates a token 174 (identified individually as 174a, 174b, and 174c) that is included in the data packet 172. The token 174 can be a series of bits, a code, or other unique identification. In general, the token 174 can comprise ASCII characters. In other systems, the phone network 162 may support the use of non-ASCII characters. In some embodiments, the enterprise 102b can include a caller verification computing device 104 (e.g., server) that accesses the token generator 108b that is stored in a database 106 or other memory device. The token 174 can be tied to a particular enterprise 102 or may be associated with a particular user or group of users. For example, the enterprise 102a may have an associated unique token 174a that is different than the token 174b that is associated with the enterprise 102b. In some embodiments, if the enterprise 102b has more than one location, such as multiple call centers located in different time zones, the token 174b associated with all of the locations may be the same.

In some embodiments, the token 174 associated with the enterprise 102 can be static and not change, and thus the token generator 108 can store a single unique token 174. In other embodiments, the token generator 108 can periodically generate a new and different token 174, such as on a schedule (e.g., weekly, monthly, every ninety days, etc.) or when commanded by the enterprise 102 (e.g., in response to a security breach and/or threat). In some cases, the enterprise 102 can push an update to the device 120 that updates the token(s) stored by the caller verification application 130. In another embodiment, an update to the application 130 can be accomplished through a service, such as an Application Store.

The spoofer 110, however, does not have a token generator and does not include a known token in the communication 170d. If the spoofer 110 does include a token 174d and it is different than what is stored in the caller verification application 130, the communication 170d will not be verified even if the spoofer 110 has included a phone number 176d and/or name 178d that matches data stored in the user's address book of their device 120.

In some embodiments, one of the caller verification applications 130 can be associated with one enterprise, such as the enterprise 102a, while another caller verification application 130 on the same device 120 can be associated with a different enterprise, such as the enterprise 102b. In other embodiments, the caller verification application 130 can be associated with multiple enterprises, such that a single application 130 can verify enterprises 102a, 102b, 102c, etc.

For example, the caller verification application 130b can include a token identifier 140, a validation image 142, a phone number 144, and a name 146. The phone number 144 and name 146 can be associated with one enterprise 102. In some embodiments, a single token identifier 140 can be used to verify one or more enterprises 102, while in other embodiments, the token identifier 140 and at least one more piece of information, such as the phone number 144 and/or name 146, may need to correspond with the information in the data packet 172 for the communication 170 to be verified.

In another example, the caller verification application 130a can include information to verify multiple enterprises 102. Each enterprise 102 can have an associated token identifier 140a, 140b, and 140c. In other cases, a single token identifier 140 can be used to verify multiple enterprises 102. In some embodiments, each enterprise 102 can also have at least one of an associated phone number 144a, 144b, 144c and/or name 146a, 146b, 146c. Although a single validation image 142 is indicated, one or more of the enterprises 102 can have their own associated validation image 142. In other embodiments, the user may identify and save one or more personalized validation images 142.

When a communication 170 is received by the device 120, the caller verification application 130 can compare the token 174 within the data packet 172 to the one or more token identifiers 140 to determine if they correspond. If the token 174 corresponds to a token identifier 140, in some embodiments, the communication 170 is verified. In other embodiments, when the token 174 corresponds to a token identifier 140, the caller verification application 130 can compare the identifying information, such as the phone number 176 and/or name 178 in the data packet 172 to the phone number 144 and/or name 146 stored in the caller verification application 130 to determine if the communication 170 was sent by the enterprise 102.

If the communication 170 is verified, the caller verification application 130 displays the validation image 142 on a display 150 (identified individually as 150a and 150b) of the device 120, as discussed further below with respect to FIGS. 3B, 3C, 4 and 5. The validation image 142 can be displayed anywhere on the display 150, such as, but not limited to, next to the name and/or phone number on the display 150 as the call is being displayed. The validation image 142 can be displayed prior to the call being answered on the device 120. In other embodiments, the validation image 142 can be displayed and associated with a text message or associated with a voicemail within a visual voicemail display or representation. In alternative embodiments, a different indication can be provided (e.g., instead of a visual indication, a particular ringtone or vibration can occur to signal verification of the calling party).

If the caller verification application 130 detects that the token 174 is not included within the data packet 172 or that the token 174 does not correspond to a token identifier 140, the caller verification application 130 ignores the communication 170. Therefore, the device 120 presents the call, text and/or voicemail on the display 150 without a validation image 142. The user of the device 120 can then decide whether they want to answer or respond to the nonverified call, text or voicemail.

In some embodiments, the caller verification computing device 104 of the enterprise 102b can also store user preferences in a memory or the database 106. User preferences can be unique validation images 142, information that facilitates additional enterprises 102 to be verified by the caller verification application 130, ringtones, vibrations patterns, etc. For example, the user may want to enter data from a particular enterprise 102, such as a doctor's office, so that they do not miss a call from the doctor. In some embodiments, the enterprise 102 can provide this information to the user through the caller verification application 130 and/or through the caller verification computing device 104.

A technical advantage of the caller verification application 130 is that when the validation image 142 is displayed on the user device 120, the user is provided with a quick, visual confirmation that the call, text and/or voicemail is a legitimate communication from the enterprise 102. For example, if an enterprise 102 such as a medical facility that may not include their phone number for display on the display 150, is associated with the caller verification application 130, the validation image 142 can inform the user that the call is verified and legitimate, and the user is more likely to answer the call, providing for better service and facilitating business between the parties.

A further technical advantage of the caller verification application 130 is that when the validation image 142 is not displayed on the user device 120, the user is provided with a quick, visual confirmation that the call may be originating from a spoofer 110. The user can easily see on the display 150 that the communication 170 is not actually sent from the enterprise 102a, because the validation image 142 is not displayed, and thus can decide not to answer.

Figure 2:
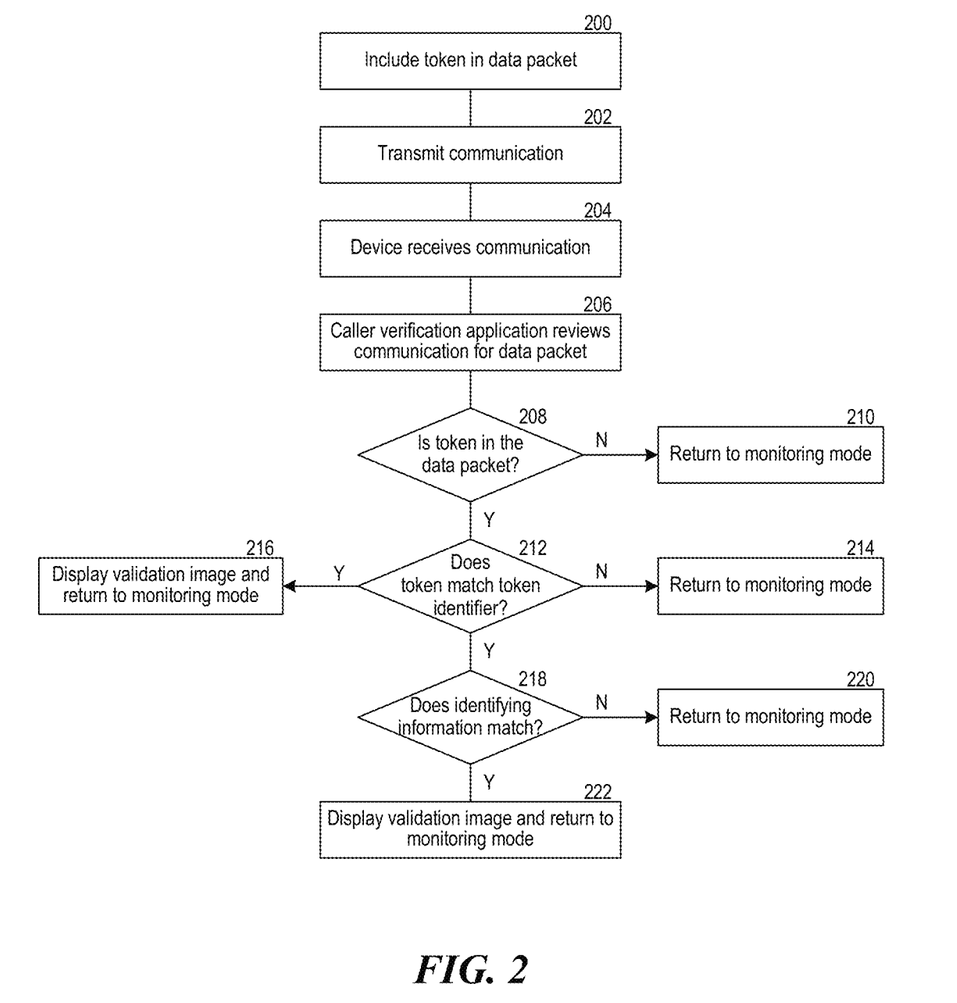
FIG. 2 shows an example process for using the caller verification application to verify a communication received by a device in accordance with embodiments of the present technology.

FIG. 2 shows an example process for using the caller verification application 130 to verify the communication 170 received by the device 120 in accordance with embodiments of the present technology. At operation 200, the enterprise 102 inserts or otherwise embeds a code or the token 174 in the data packet 172 of the communication 170. The token 174 or other code may be generated by the token generator 108 and/or stored in a database 106 or other memory. The communication 170 can be an initiator of a voice call, text message, and/or other type of instant message. At operation 202, the enterprise 102 transmits the communication 170 over the network 160, and at operation 204, the device 120 receives the communication 170. The caller verification application 130 is running on the device 120 in any mode that allows the application 130 to monitor the device 120 for incoming communications 170.

At operation 206, the caller verification application 130 reviews the communication 170 to determine if the data packet 172 has been included. At operation 208, if the caller verification application 130 does not identify a token 174 within the data packet 172, the method passes to operation 210 and the caller verification application 130 returns to a monitoring or background mode.

Returning to operation 208, in response to the caller verification application 130 identifying the token 174 within the data packet 172, the method passes to operation 212 where the caller verification application 130 compares the token 174 to the one or more token identifiers 140. In response to the token 174 not corresponding to a token identifier 140, the method passes to operation 214 and the caller verification application 130 returns to a monitoring or background mode. In other embodiments, if the token 174 is identified within data packet 172 at operation 208, the caller verification application 130 may display a validation image 142 on the display of the device 120 without comparing the token 174 to a token identifier 140.

In some embodiments, in response to the token 174 corresponding to the token identifier 140 at operation 212, the method passes to operation 216 and the caller verification application 130 displays a validation image 142 on the display 150 of the device 120. The caller verification application 130 can then return to the monitoring or background mode.

In other embodiments, additional information can be correlated and/or checked for a match before verifying the communication 170. Therefore, in response to the token 174 corresponding to the token identifier 140 at 212, the method can pass to operation 218 where the caller verification application 130 determines if there is additional identifying information, such as the phone number 176 and/or name 178, in the data packet 172. The caller verification application 130 can compare the phone number 176 to the one or more phone numbers 144 and/or compare the name 178 to the one or more names 146 to see if there is any correspondence between the stored and transmitted data.

In response to one or more pieces of identifying information within the data packet 172 not corresponding with the identifying information stored in the caller verification application 130, the method passes to operation 220. The caller verification application 130 returns to a monitoring or background mode and the communication 170 is not verified.

In response to one or more of the pieces of identifying information corresponding at operation 218, the method passes to operation 222. The communication 170 is verified and the validation image 142 is displayed. The caller verification application 130 can then return to a monitoring or background mode until the next communication 170 is received by the device 120.

Comparing the token 174 within the data packet 172 to the token identifier(s) 140 provides a technical advantage as it is impossible for a user to determine if a call or text is actually from the identified name, number or location that is displayed on the display 150 of the device 120. An additional technical advantage is realized as multiple factors can be evaluated to ensure that the call actually should be verified, and that the token 174 and/or other information included in the data packet 172 has not been falsified by the sender.

Figure 3A:
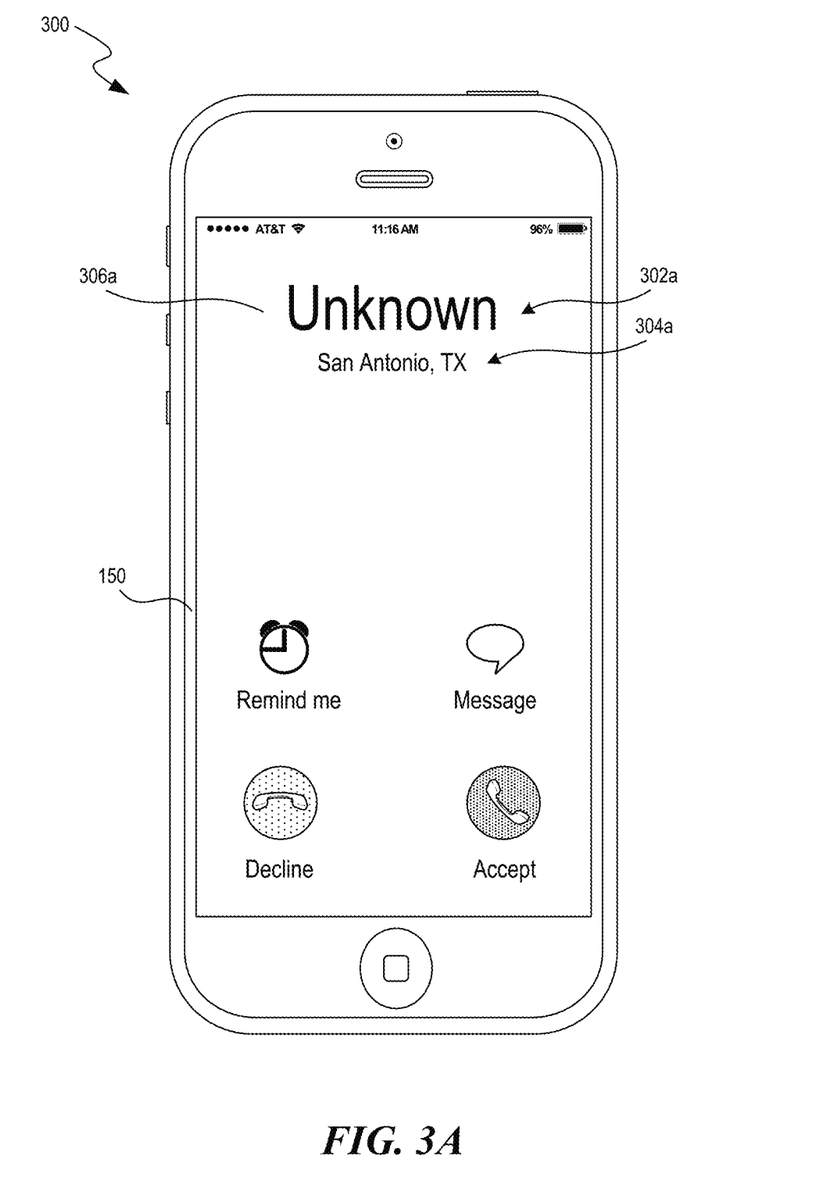
FIG. 3A shows an example display of a voice call that is not verified.
Figure 3B:
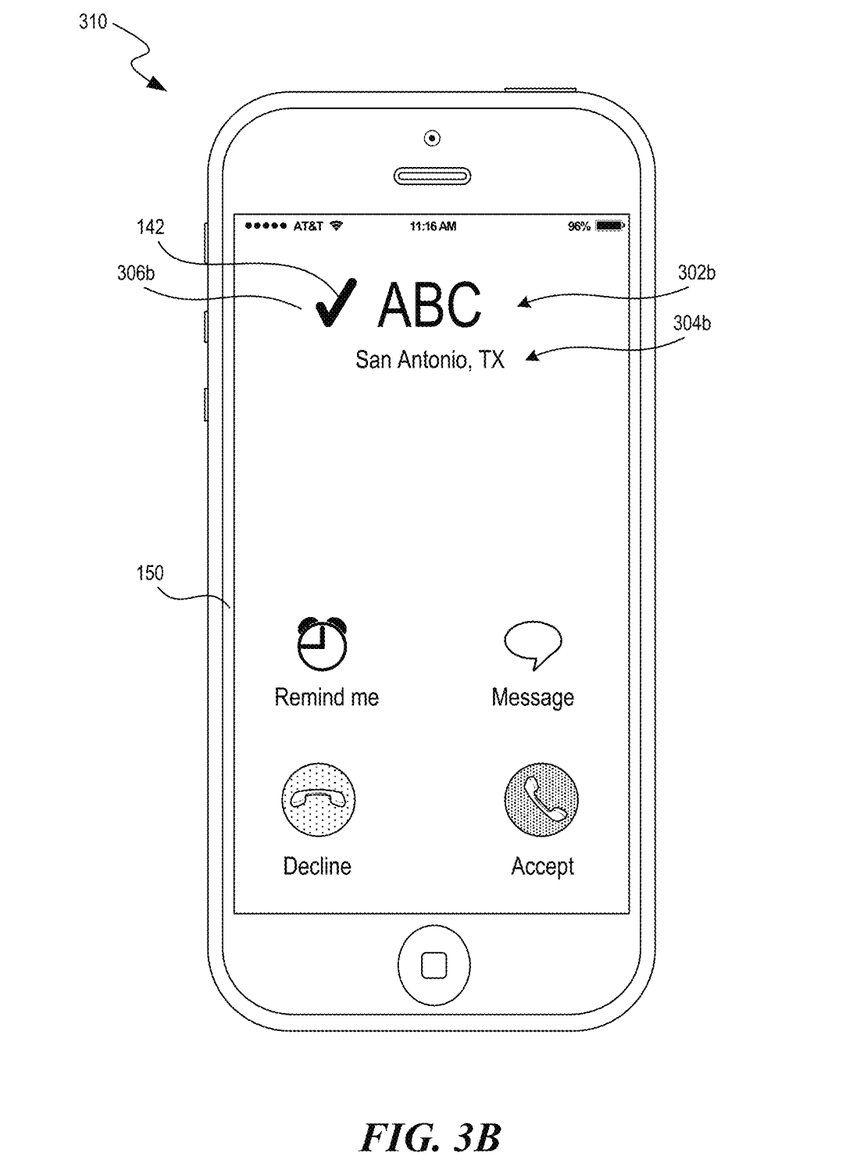
FIGS. 3B and 3C show two different examples of a verified voice call on a display in accordance with embodiments of the present technology.
Figure 3C:
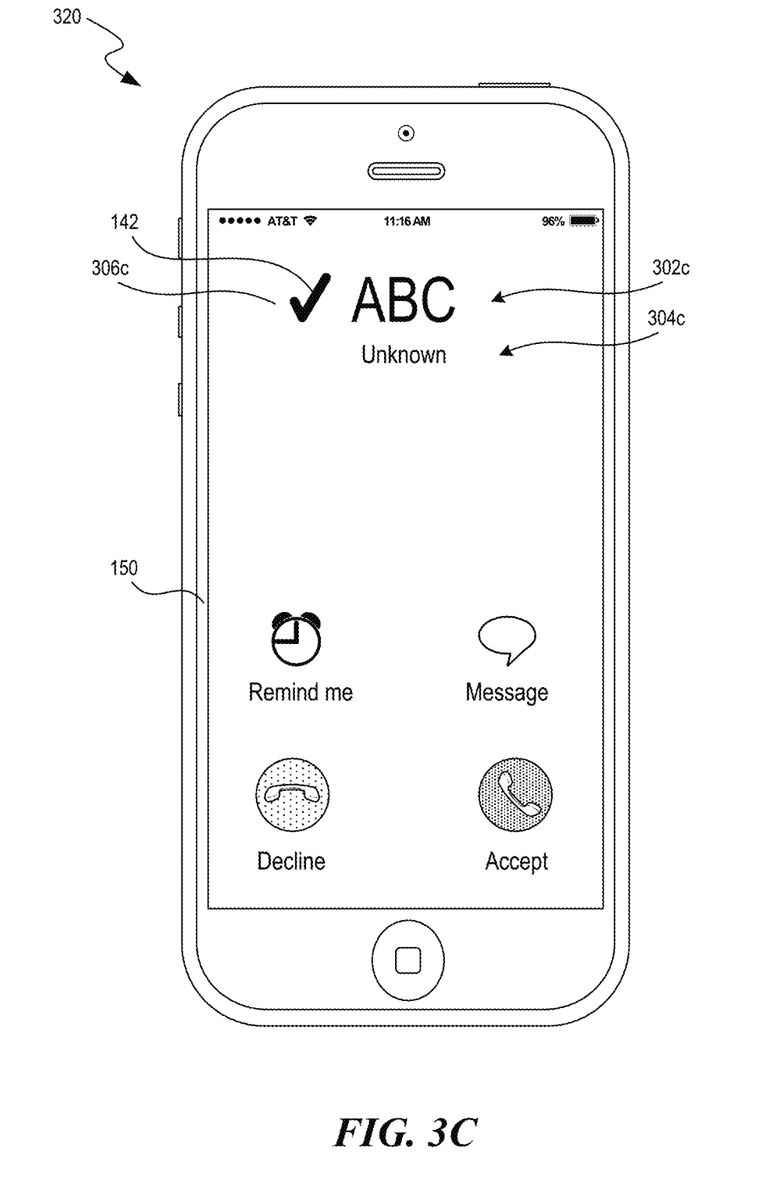

II. Display Validation Image Associated with Verified Calls, Voicemails and Texts FIGS. 3A, 3B and 3C illustrate example screen shots of the display 150 of the device 120 that is receiving the communication 170 as a voice call in accordance with embodiments of the present technology. Caller identification location 302 (identified individually as 302a, 302b, and 302c), call origination location 304 (identified individually as 304a, 304b, and 304c), and validation image location (306a, 306b, 306c) are indicated.

FIG. 3A shows an example display 300 of a voice call that is not verified. For example, the data packet 172 may have been sent with no token 174 and/or identification information (e.g. phone number 176, name 178), or the token 174 and/or other identification information in the data packet 172 cannot be verified by the caller verification application 130. If no information was included within the packet 172 to identify the caller (e.g., phone number 176, name 178), the device 120 can display "Unknown" in the caller identification location 302a. The location from which the communication 170 originated can be sent within the data packet 172 or by other methods used by the phone network 162. In this example, "San Antonio, TX" is identified and displayed in the call origination location 304a. There is no validation image 142 displayed in the validation image location 306a of the display 150.

FIG. 3B shows an example display 310 of a verified voice call in accordance with embodiments of the present technology. To indicate that the voice call is verified, the validation image 142 stored in the caller verification application 130 is displayed on the display 150 at validation image location 306b. The name of the caller is displayed in the caller identification location 302b and the origination location of the communication 170 is displayed in the call origination location 304b. In some embodiments, the phone number 176 and/or name 178 may have been included in the data packet 172 and used by the caller verification application 130 to identify the caller. In other embodiments, the caller verification application 130 can identify the caller after verifying the token 174 sent in the data packet 172.

FIG. 3C shows a different example display 320 of the verified voice call on the device 120 in accordance with embodiments of the present technology. For example, if the token 174 is sent within the data packet 172 and verified by the caller verification application 130, but one of the enterprise name and/or location have not been identified, the caller verification application 130 can still display the validation image 142 in the validation image location 306c on the display 150.

Although the validation image 142 is illustrated as a checkmark in FIGS. 3B and 3C, the validation image 142 can be any image identified by the caller verification application 130 or saved by the user as discussed previously. Also, the validation image 142 can be the same image for every enterprise 102 that is validated, or one or more enterprises 102 may have a unique validation image 142. Furthermore, the validation image location 306 is not limited to being displayed as shown on FIGS. 3B and 3C. The validation image 142 can be displayed anywhere on the display 150.

Figure 4:
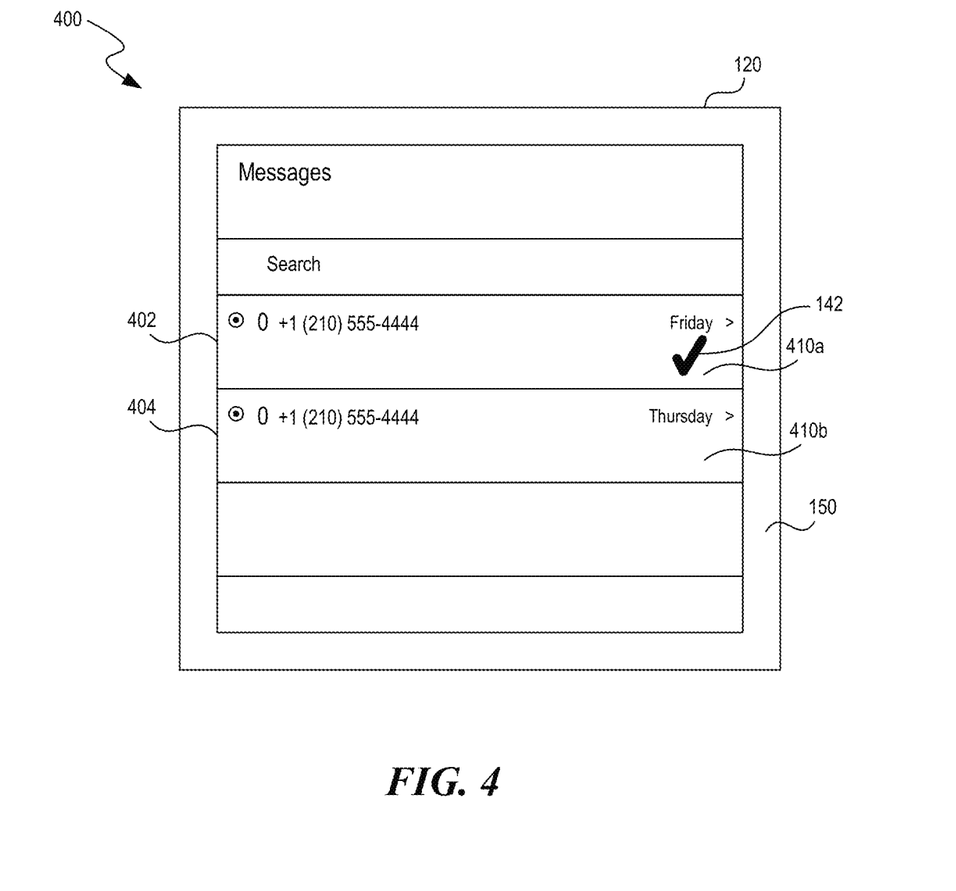
FIG. 4 shows an example display of verified and unverified text messages in accordance with embodiments of the present technology.

FIG. 4 shows an example display 400 of text messages on the device 120 in accordance with embodiments of the present technology. First and second text messages 402 and 404 are shown. If, for example, the caller verification application 130 identifies the token 174 in the communication 170 corresponding to the first text message 402, the caller verification application 130 can display the validation image 142 at validation image location 410a. As discussed previously, the validation image location 410 can be located elsewhere on the display 400.

If, however, the caller verification application 130 does not identify the token 174 within the data packet 172 or the token 174 does not correspond to a token identifier 140, the validation image 142 is not displayed. By way of example, the second text message 404 was not verified by the caller verification application 130 and thus does not have an associated validation image 142 displayed in validation image location 410b.

A technical advantage of displaying the validation image 142 associated with validated text messages, such as the first text message 402, is that the user knows that the first text message 402 was sent from a trusted and reliable source. If, for example, the first text message 402 was sent from a financial institution such as the enterprise 102c, the first text message 402 may include sensitive personal information and/or links that the user can trust. However, the second text message 404 also appears to come from a trusted source such as the enterprise 102c but does not include the validation image 142. Therefore, even though the second text message 404 displays the same phone number as the first text message 402, the user is notified that the communication 170 was sent without the token 174 or with an erroneous/spoofed token and was not verified, and thus may be sent from a spoofer 110. The user may thus be suspicious and refrain from clicking on embedded links or otherwise responding to the second text message 404.

Figure 5:
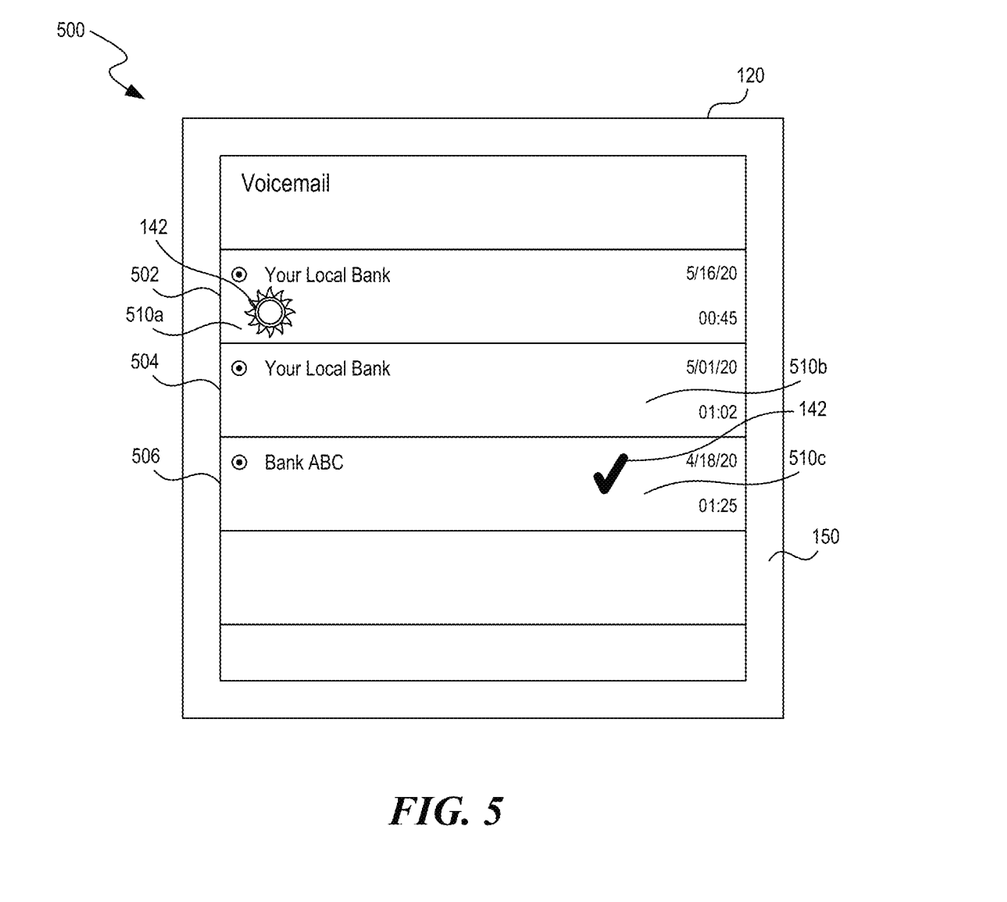
FIG. 5 shows an example of verified and unverified voicemail messages on a visual voicemail display in accordance with embodiments of the present technology.

FIG. 5 shows an example display 500 of voicemail messages on a visual voicemail of the device 120 in accordance with embodiments of the present technology. First, second, and third voicemail messages 502, 504, and 506 are shown. As with the example of FIG. 4, if the caller verification application 130 verifies the token 174 in the communication 170 corresponding to the first voicemail message 502, and in some embodiments, one or both of the phone number 178 and name 178, the caller verification application 130 can display the validation image 142 at validation image location 510a. Turning to the third voicemail message 506, if the caller verification application 130 determines that the token 174 in the communication 170 corresponds to the token identifier 140, the caller verification application 130 can display the validation image 142 at the validation image location 510c.

With respect to the second voicemail message 504, a name is displayed that was either included in the communication 170 or discovered within the stored contacts on the device 120. However, either no token 174 was identified within the communication 170 or the token 174 within the communication 170 did not correlate to a stored token identifier 140. Also, if the caller verification application 130 requires additional factors to be verified, such as the phone number 176 and/or name 178, either these items were not included in the communication 170 or did not correspond with stored data within the caller verification application

130. Therefore, the caller verification application 130 does not display a validation image 142 in the validation image location 510*b*.

As shown in FIG. 5, different validation images 142 can be associated with different enterprises 102. For example, the validation image 142 associated with the first voicemail message 502 is different compared to the validation image 142 associated with the third voicemail message 506. Also, the validation image locations 510*a* and 510*c* on the display 150 of the device 120 are different.

A technical advantage of displaying the validation image 142 associated with validated voicemail messages, such as the first and third voicemail messages 502, 506, is that the user knows that the first and third voicemail messages 502, 506 were sent from trusted and reliable sources. The second voicemail message 504, while showing the name of the same enterprise 102 as the first voicemail message 502, is not verified and thus the user has a visual indication that the second voicemail message 504 may have been sent from a spoofer 110. The user can then take appropriate precautions when responding to the second voicemail message 504.

Figure 6:
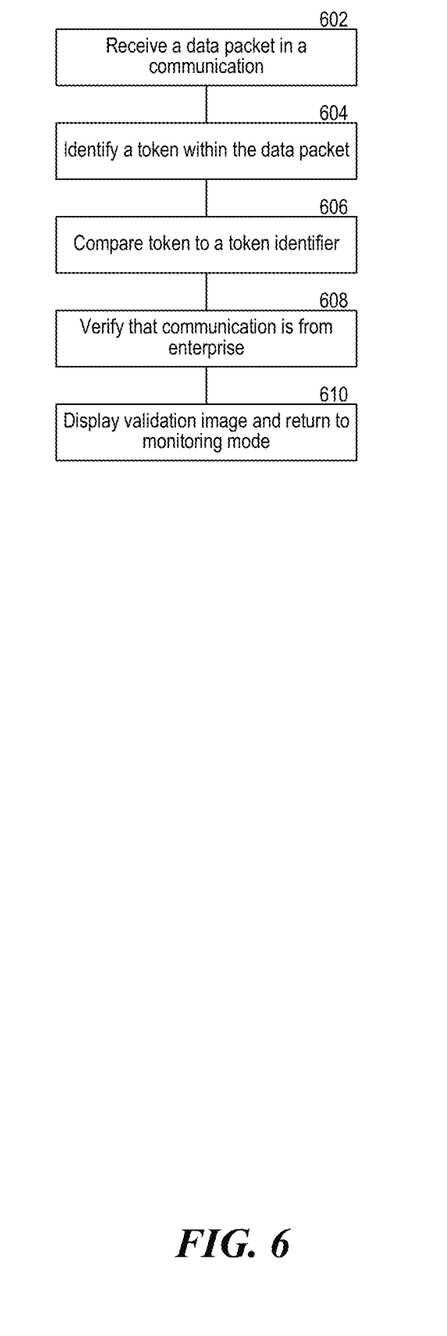
FIG. 6 shows an example process for using the caller verification application to verify a communication received by a device in accordance with embodiments of the present technology.

FIG. 6 shows an example process for using the caller verification application 130 to verify the communication 170 received by the device 120 in accordance with embodiments of the present technology. In operation 602, a device can receive a data packet from a phone network. The data packet can be included in a communication to the device (e.g., phone call, text message). The device can include an application configured to verify communications from at least one calling party. In operation 604, the application identifies a token within the data packet, and in operation 606, the application compares the token to a token identifier associated with the calling party. In response to the token corresponding to the token identifier, in operation 608, the application verifies that the communication is from the calling party, and, in operation 610, the device displays a validation image on the device or provides some other indication that the calling party is verified.

Figure 7:
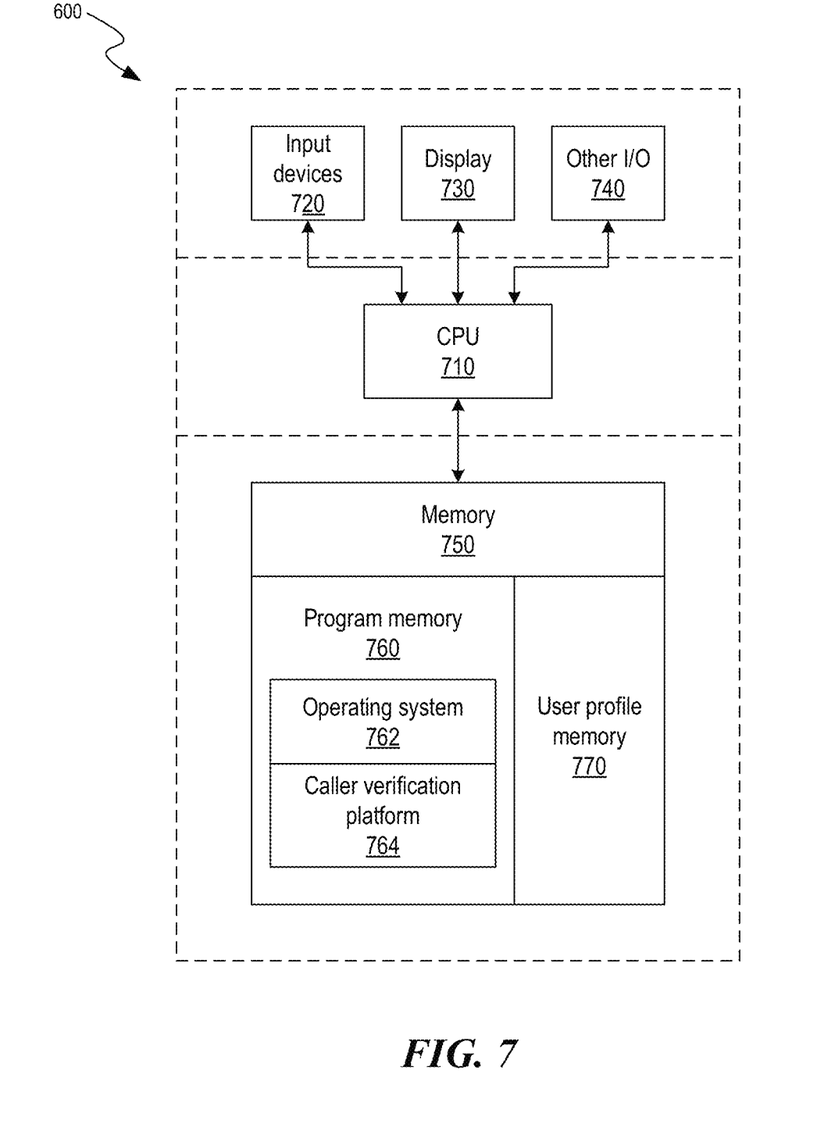
FIG. 7 is a block diagram illustrating an overview of devices on which some implementations of a caller verification computing device can operate in accordance with embodiments of the present technology.

FIG. 7 is a block diagram illustrating an overview of devices on which some implementations of the caller verification computing device 104 can operate in accordance with embodiments of the present technology and will be discussed together with some of the elements of FIG. 1. The devices can comprise hardware components of a device 700, such as the caller verification computing device 104 that includes a caller verification platform 764 that can send data to the caller verification application 130 on the device 120. The caller verification platform 764 can also send communications such as text messages and emails to the device 120 via an application and/or a web browser.

Device 700 can include one or more input devices 720 that provide input to the CPU (processor) 710, notifying it of actions. The actions are typically mediated by a hardware controller that interprets the signals received from the input device 720 and communicates the information to the CPU 710 using a communication protocol. Input devices 720 include, for example, a mouse, a keyboard, a touchscreen, an infrared sensor, a touchpad, a wearable input device, a camera- or image-based input device, a microphone, or other user input devices.

CPU 710 can be a single processing unit or multiple processing units in a device or distributed across multiple devices. CPU 710 can be coupled to other hardware devices, for example, with the use of a bus, such as a PCI bus or SCSI bus. The CPU 710 can communicate with a hardware controller for devices, such as for a display 730. Display 730 can be used to display text and graphics. In some examples, display 730 provides graphical and textual visual feedback to a person operating the device 700. In some implementations, display 730 includes the input device as part of the display, such as when the input device is a touchscreen or is equipped with an eye direction monitoring system. In some implementations, the display is separate from the input device. Examples of display devices are: an LCD display screen; an LED display screen; a projected, holographic, or augmented reality display (such as a heads-up display device or a head-mounted device); and so on. Other I/O devices 740 can also be coupled to the processor, such as a network card, video card, audio card, USB, FireWire or other external device, camera, printer, speakers, CD-ROM drive, DVD drive, disk drive, or Blu-Ray device.

In some implementations, the device 700 also includes a communication device capable of communicating wirelessly or wire-based with a network node (e.g., a server) or with a user device (e.g., a laptop, desktop, or mobile device) or with one or more computers (e.g., desktop or laptop). The communication device can communicate with another device or a server through a network using, for example, TCP/IP protocols. Device 700 can utilize the communication device to distribute operations across multiple network devices.

The CPU 710 can have access to a memory 750. A memory includes one or more of various hardware devices for volatile and non-volatile storage and can include both read-only and writable memory. For example, a memory can comprise random access memory (RAM), CPU registers, read-only memory (ROM), and writable non-volatile memory, such as flash memory, hard drives, floppy disks, CDs, DVDs, magnetic storage devices, tape drives, device buffers, and so forth. A memory is not a propagating signal divorced from underlying hardware; a memory is thus non-transitory. Memory 750 can include program memory 760 that stores programs and software, such as an operating system 762 and the caller verification platform 764. The caller verification platform 764 may include modules or processes or methods for requesting and receiving information from a user and devices and sensors associated with the user. The caller verification platform 764 can send communications 170 that have a token 174 embedded therein to a telephone number to facilitate the verification of a call, voicemail and/or text from an enterprise 102, as described in Sections I and II and FIGS. 1 to 5 of this patent document. The caller verification platform 764 may also include modules for identifying a name or telephone number of an enterprise 102 to assist the user with determining whether a communication is sent from a trusted source or a spoofer 110 and providing a digital solution as described in Sections I and II and in FIGS. 1 to 5 of this patent document. Thus, for example, the memory 750 may store instructions that upon execution by CPU 710 configure the device 700 to perform the operations described for the caller verification computing device 104 in FIGS. 1 to 5 and/or in the various embodiments described in this patent document. Memory 750 can also include user profile memory 770 that can include one or more enterprises 102 that the user would like to verify with the caller verification application 130 as described in this patent document, which can be provided to the program memory 760 or any element of the device 700.

Some implementations can be operational with numerous other general purpose or special purpose computing system environments or configurations. Examples of well-known computing systems, environments, and/or configurations that may be suitable for use with the technology include, but are not limited to, personal computers, server computers, handheld or laptop devices, cellular telephones, portable electronic devices such as smartphones, wearable electronics, gaming consoles, tablet devices, multiprocessor systems, microprocessor-based systems, set-top boxes, programmable consumer electronics, network PCs, minicomputers, mainframe computers, distributed computing environments that include any of the above systems or devices, or the like.

Those skilled in the art will appreciate that the components illustrated in FIG. 1-6 described above, and in each of the flow diagrams, may be altered in a variety of ways. For example, the order of the logic may be rearranged, sub-steps may be performed in parallel, illustrated logic may be omitted, other logic may be included, etc. In some implementations, one or more of the components described above can execute one or more of the processes described above.

CONCLUSION

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import, when used in this application, refer to this application as a whole and not to any particular portions of this application. Where the context permits, words in the above Detailed Description using the singular or plural number may also include the plural or singular number respectively.

Several implementations of the disclosed technology are described above in reference to the figures. The computing devices on which the described technology may be implemented can include one or more central processing units, memory, user devices (e.g., keyboards and pointing devices), output devices (e.g., display devices), storage devices (e.g., disk drives), and network devices (e.g., network interfaces). The memory and storage devices are computer-readable storage media that can store instructions that implement at least portions of the described technology. In addition, the data structures and message structures can be stored or transmitted via a data transmission medium, such as a signal on a communications link. Various communications links can be used, such as the Internet, a local area network, a wide area network, or a point-to-point dial-up connection. Thus, computer-readable media can comprise computer-readable storage media (e.g., "non-transitory" media) and computer-readable transmission media.

As used herein, being above a threshold means that a value for an item under comparison is above a specified other value, that an item under comparison is among a certain specified number of items with the largest value, or that an item under comparison has a value within a specified top percentage value. As used herein, being below a threshold means that a value for an item under comparison is below a specified other value, that an item under comparison is among a certain specified number of items with the smallest value, or that an item under comparison has a value within a specified bottom percentage value. As used herein, being within a threshold means that a value for an item under comparison is between two specified other values, that an item under comparison is among a middle specified number of items, or that an item under comparison has a value within a middle specified percentage range.

As used herein, the word "or" refers to any possible permutation of a set of items. For example, the phrase "A, B, or C" refers to at least one of A, B, C, or any combination thereof, such as any of: A; B; C; A and B; A and C; B and C; A, B, and C; or multiple of any item, such as A and A; B, B, and C; A, A, B, C, and C; etc.

The above Detailed Description of examples of the technology is not intended to be exhaustive or to limit the technology to the precise form disclosed above. While specific examples for the technology are described above for illustrative purposes, various equivalent modifications are possible within the scope of the technology. For example, while processes or blocks are presented in a given order, alternative implementations may perform routines having steps, or employ systems having blocks, in a different order, and some processes or blocks may be deleted, moved, added, subdivided, combined, and/or modified to provide alternative or subcombinations. Each of these processes or blocks may be implemented in a variety of different ways. Also, while processes or blocks are at times shown as being performed in series, these processes or blocks may instead be performed or implemented in parallel, or may be performed at different times. Further any specific numbers noted herein are only examples: alternative implementations may employ differing values or ranges.

The teachings of the technology provided herein can be applied to other systems, not necessarily the system described above. The elements and acts of the various examples described above can be combined to provide further implementations of the technology. Some alternative implementations of the technology may include not only additional elements to those implementations noted above, but also may include fewer elements.

These and other changes can be made to the technology in light of the above Detailed Description. While the above description describes certain examples of the technology, and describes the best mode contemplated, no matter how detailed the above appears in text, the technology can be practiced in many ways. Details of the system may vary considerably in its specific implementation, while still being encompassed by the technology disclosed herein. As noted above, particular terminology used when describing certain features or aspects of the technology should not be taken to imply that the terminology is being redefined herein to be restricted to any specific characteristics, features, or aspects of the technology with which that terminology is associated. In general, the terms used in the following claims should not be construed to limit the technology to the specific examples disclosed in the specification, unless the above Detailed Description section explicitly defines such terms. Accordingly, the actual scope of the technology encompasses not only the disclosed examples, but also all equivalent ways of practicing or implementing the technology under the claims.

To reduce the number of claims, certain aspects of the technology are presented below in certain claim forms, but the applicant contemplates the various aspects of the technology in any number of claim forms. For example, while only one aspect of the technology is recited as a machine-readable medium claim, other aspects may likewise be embodied as a machine-readable medium claim, or in other forms, such as being embodied in a means-plus-function claim. Any claims intended to be treated under 35 U.S.C. § 112(f) will begin with the words "means for", but use of the term "for" in any other context is not intended to invoke treatment under 35 U.S.C. § 112(f). Accordingly, the applicant reserves the right to pursue additional claims after filing this application to pursue such additional claim forms, in either this application or in a continuing application.

What is claimed is:

1. A method for verifying a communication, the method comprising:
   generating, by at least one enterprise device, a token that identifies at least one enterprise associated with the at least one enterprise device;
   embedding, by the at least one enterprise device, the token in a data packet; and
   sending, by the at least one enterprise device, a communication that includes the data packet with the token to a device associated with a user,
      wherein the device associated with the user includes an application configured to verify communications from the at least one enterprise,
      wherein the token corresponds to at least one token identifier that identifies the communication is from the at least one enterprise, and
      wherein in response to the communication being token-verified by the device, the device plays an audible token-based verification notification that identifies the at least one enterprise.

2. The method of claim 1, further comprising:
   periodically generating, by the at least one enterprise device, a second token to replace the token; and
   embedding, by the at least one enterprise device, the second token in a second data packet.

3. The method of claim 1,
   wherein the token is stored, via the application, on the device; and
   wherein the method further comprises pushing a token update to the device associated with the user, wherein the token update updates the token stored by the application on the device.

4. The method of claim 1, further comprising:
   detecting, at the at least one enterprise, a security breach;
   in response to detecting the security breach, generating, by the at least one enterprise device, a second token to replace the token; and
   embedding, by the at least one enterprise device, the second token in a second data packet sent to the device of the user.

5. The method of claim 1, wherein the at least one token identifier identifies a location of the at least one enterprise from a plurality of locations associated with the at least one enterprise.

6. The method of claim 1, wherein the token is a series of bits, a code, or a unique identification of the at least one enterprise, and wherein the token includes ASCII characters.

7. The method of claim 1, wherein the communication is a phone call, a voicemail, or a text message.

8. A system comprising:
   one or more processors; and
   one or more memories storing instructions that, when executed by the one or more processors, cause the system to perform a process for verifying a communication, the process comprising:
      generating, by at least one enterprise device, a token that identifies at least one enterprise associated with the at least one enterprise device;
      embedding, by the at least one enterprise device, the token in a data packet; and
      sending, by the at least one enterprise device, a communication that includes the data packet with the token to a device associated with a user,
         wherein the device associated with the user includes an application configured to verify communications from the at least one enterprise,
         wherein the token corresponds to at least one token identifier that identifies the communication is from the at least one enterprise, and
         wherein in response to the communication being token-verified by the device, the device plays an audible token-based verification notification that identifies the at least one enterprise.

9. The system according to claim 8, wherein the process further comprises:
   periodically generating, by the at least one enterprise device, a second token to replace the token; and
   embedding, by the at least one enterprise device, the second token in a second data packet.

10. The system according to claim 8,
    wherein the token is stored, via the application, on the device; and
    wherein the process further comprises pushing a token update to the device associated with the user, wherein the token update updates the token stored by the application on the device.

11. The system according to claim 8, wherein the process further comprises:
    detecting, at the at least one enterprise, a security breach;
    in response to detecting the security breach, generating, by the at least one enterprise device, a second token to replace the token; and
    embedding, by the at least one enterprise device, the second token in a second data packet sent to the device of the user.

12. The system according to claim 8, wherein the at least one token identifier identifies a location of the at least one enterprise from a plurality of locations associated with the at least one enterprise.

13. The system according to claim 8, wherein the token is a series of bits, a code, or a unique identification of the at least one enterprise, and wherein the token includes ASCII characters.

14. The system according to claim 8, wherein the communication is a phone call, a voicemail, or a text message.

15. A non-transitory computer-readable medium storing instructions that, when executed by a computing system, cause the computing system to perform operations for verifying a communication, the operations comprising:
    generating, by at least one enterprise device, a token that identifies at least one enterprise associated with the at least one enterprise device;
    embedding, by the at least one enterprise device, the token in a data packet; and
    sending, by the at least one enterprise device, a communication that includes the data packet with the token to a device associated with a user,
       wherein the device associated with the user includes an application configured to verify communications from the at least one enterprise,
       wherein the token corresponds to at least one token identifier that identifies the communication is from the at least one enterprise, and
       wherein in response to the communication being token-verified by the device, the device plays an audible token-based verification notification that identifies the at least one enterprise.

16. The non-transitory computer-readable medium of claim 15, wherein the operations further comprise:

periodically generating, by the at least one enterprise device, a second token to replace the token; and embedding, by the at least one enterprise device, the second token in a second data packet.

17. The non-transitory computer-readable medium of claim 15, wherein the token is stored, via the application, on the device; and wherein the operations further comprise pushing a token update to the device associated with the user, wherein the token update updates the token stored by the application on the device.

18. The non-transitory computer-readable medium of claim 15, wherein the operations further comprise:

detecting, at the at least one enterprise, a security breach;

in response to detecting the security breach, generating, by the at least one enterprise device, a second token to replace the token; and embedding, by the at least one enterprise device, the second token in a second data packet sent to the device of the user.

19. The non-transitory computer-readable medium of claim 15, wherein the at least one token identifier identifies a location of the at least one enterprise from a plurality of locations associated with the at least one enterprise.

20. The non-transitory computer-readable medium of claim 15, wherein the token is a series of bits, a code, or a unique identification of the at least one enterprise, and wherein the token includes ASCII characters.

* * * * *